(12) United States Patent
Vilanov et al.

(10) Patent No.: US 7,479,759 B2
(45) Date of Patent: Jan. 20, 2009

(54) ELECTRONIC DEVICE INCLUDING HANDHELD ELECTRONIC DEVICE WITH DUAL BATTERY CONFIGURATION, AND ASSOCIATED METHOD

(75) Inventors: Kamen B. Vilanov, Toronto (CA); Dusan Veselic, Oakville (CA)

(73) Assignee: Research In Motion Limited, Waterloo, Ontario (CA)

( * ) Notice: Subject to any disclaimer, the term of this patent is extended or adjusted under 35 U.S.C. 154(b) by 265 days.

(21) Appl. No.: 10/788,078

(22) Filed: Feb. 26, 2004

(65) Prior Publication Data
US 2005/0189913 A1 Sep. 1, 2005

(51) Int. Cl.
*H02J 7/00* (2006.01)
(52) U.S. Cl. .............. 320/115; 320/103; 320/107; 320/114
(58) Field of Classification Search .......... 320/114, 320/115, 103, 107, 112, 113
See application file for complete search history.

(56) References Cited

U.S. PATENT DOCUMENTS

| | | | | | |
|---|---|---|---|---|---|
| 5,519,776 | A | * | 5/1996 | Kodama | 379/435 |
| 6,002,237 | A | * | 12/1999 | Gaza | 320/116 |
| 6,018,229 | A | * | 1/2000 | Mitchell et al. | 320/112 |
| 6,108,568 | A | * | 8/2000 | Lebrun et al. | 455/573 |
| 6,172,481 | B1 | * | 1/2001 | Curtiss | 320/127 |
| 6,184,654 | B1 | * | 2/2001 | Bachner et al. | 320/114 |
| 2002/0139822 | A1 | | 10/2002 | Infanti | |
| 2003/0155887 | A1 | | 8/2003 | Bourilkov et al. | |
| 2003/0178967 | A1 | | 9/2003 | Khatri | |
| 2004/0004460 | A1 | | 1/2004 | Fitch et al. | |
| 2004/0147293 | A1 | * | 7/2004 | Park | 455/573 |

FOREIGN PATENT DOCUMENTS

| | | |
|---|---|---|
| GB | 2352887 A | 2/2001 |
| GB | 2386267 A | 9/2003 |
| WO | WO0054359 | 9/2000 |

OTHER PUBLICATIONS

"Single-Chip, Li-Ion and Li-Pol Charger IC With Autonomous USB-Port and AC-Adapter Supply Management (bqTINY™ -II)";Texas Instruments; Dec. 2002, Revised Sep. 2003;SLUS549A;Texas Instruments, P.O. Box 655303, Dallas, Texas 75265. USA.
"96% Efficient Synchronous Boost Converter With 1.5-A Switch";Texas Instruments;Sep. 2003;SLVS451:Texas Instruments, P.O. Box 655303, Dallas, Texas 75265, USA.

* cited by examiner

*Primary Examiner*—Akm E Ullah
*Assistant Examiner*—Richard V Muralidar
(74) *Attorney, Agent, or Firm*—Brij K. Agarwal; Eckert Seamans Cherin & Mellott, LLC

(57) ABSTRACT

An improved handheld electronic device in conjunction with an improved holder for the handheld electronic device together form an improved electronic device. The handheld electronic device includes a first battery, and the holder includes a second battery and a charging apparatus. When the handheld electronic device and the holder are electrically connected together, such as when the handheld electronic device is received in a cavity formed in the holder and a plurality of first contacts on the handheld electronic device and a plurality of second contacts on the holder are electrically connected together, the charging apparatus charges the first battery on the handheld electronic device from the second battery on the holder.

13 Claims, 6 Drawing Sheets

ELECTRONIC DEVICE INCLUDING HANDHELD ELECTRONIC DEVICE WITH DUAL BATTERY CONFIGURATION, AND ASSOCIATED METHOD

BACKGROUND OF THE INVENTION

1. Field of the Invention

The invention relates generally to handheld electronic devices and, more particularly, to an electronic device that recharges a handheld electronic device. The invention also relates to a method of charging a battery on a handheld electronic device.

2. Background Information

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are small and battery-powered. While some handheld electronic devices include a wireless communication capability, other handheld electronic devices are stand-alone devices that do not communicate with other devices.

A battery of a handheld electronic device typically constitutes a significant portion of the weight of the handheld electronic device. While it is often desirable to reduce the weight and shrink the form factor of a handheld electronic device, it is nevertheless necessary to provide sufficient battery power and capacity to enable the handheld electronic device to function properly for an appropriate duration of time. Power consumption can be of particular importance in handheld electronic devices having a wireless capability that complies with GPRS/GSM operating guidelines, since a power amplifier of such a handheld electronic device can have a peak current requirement of up to about 2.5 amperes during transmission bursts.

It would be desirable to provide an improved handheld electronic device having a reduced weight and/or a smaller form factor than currently known devices without sacrificing battery power or battery life.

SUMMARY OF THE INVENTION

An improved handheld electronic device in conjunction with an improved holder for the handheld electronic device together form an improved electronic device in accordance with the invention. The handheld electronic device includes a first battery, and the holder includes a second battery and a charging apparatus. When the handheld electronic device and the holder are electrically connected together, such as when the handheld electronic device is received in a cavity formed in the holder and a plurality of first contacts on the handheld electronic device and a plurality of second contacts on the holder are electrically connected together, the charging apparatus charges the first battery on the handheld electronic device from the second battery on the holder.

Accordingly, an aspect of the invention is to provide an improved electronic device including an improved handheld electronic device and an improved holder for the handheld electronic device, with the electronic device having an improved battery configuration.

Another aspect of the invention is to provide an improved electronic device having an improved handheld electronic device having a relatively small battery and a holder having another relatively small battery and a charging circuit, whereby the charging circuit charges the battery of the handheld electronic device from the battery of the holder when the handheld electronic device and the holder are electrically connected together.

Another aspect of the invention is to provide an improved handheld electronic device having the benefit of a large battery capability by providing a relatively smaller first battery on the handheld electronic device and another relatively smaller battery on a holder, with the holder additionally including a charging apparatus whereby, when the handheld electronic device and the holder are electrically connected together, the charging apparatus charges the first battery from the second battery.

Another aspect of the invention is to provide an improved method of charging a battery on a handheld electronic device by providing a holder having a battery and a charging apparatus wherein, when the handheld electronic device and the holder are electrically connected together, the charging apparatus charges the battery of the handheld electronic device from the battery of the holder.

Another aspect of the invention is to provide an improved electronic device having an improved handheld electronic device and an improved holder, wherein the handheld electronic device includes a first battery, and wherein the holder includes a second battery, a first charging apparatus, and a second charging apparatus, with the first charging apparatus charging the first battery of the handheld electronic device from the second battery of the holder, and with the second charging apparatus charging the second battery of the holder from an external power source.

Another aspect of the invention is to provide an improved holder that is adapted to be used in conjunction with a handheld electronic device, wherein the holder includes a battery, a first charging apparatus, and a second charging apparatus, with the first charging apparatus being adapted to charge the handheld electronic device from the battery of the holder, and with the second charging apparatus being adapted to charge the battery of the holder from an external power source.

These and other aspects of the invention are provided by an improved electronic device, the general nature of which can be stated as including a handheld electronic device, a holder, and a charging apparatus. The handheld electronic device has a first battery, and the holder has a second battery. The handheld electronic device and the holder are electrically connectable together. The charging apparatus is disposed on at least one of the handheld electronic device and the holder, and the charging apparatus is adapted to charge the first battery from the second battery.

The improved electronic device may be configured such that the charging apparatus includes a charging circuit that is adapted to provide substantially constant current to the first battery during a first portion of a charging operation and to provide substantially constant voltage to the first battery during a second portion of the charging operation. The electronic device may additionally be configured such that the charging apparatus further includes a voltage boost circuit that is adapted to receive current from the second battery at a first voltage and to output current to the charging circuit at a second voltage, the second voltage being greater than the first voltage.

The electronic device may be configured such that the charging apparatus is a first charging apparatus, with the holder including a second charging apparatus adapted to charge the second battery from an external power source. Moreover, such an electronic device may be configured such that the second charging apparatus includes a charging circuit that is adapted to provide substantially constant current to the second battery during a first portion of a charging operation and to provide substantially constant voltage to the second battery during a second portion of the charging operation.

Another aspect of the invention is to provide an improved method of charging a first battery on a handheld electronic device, in which the general nature of the method can be stated as including providing current from a second battery on a holder to a charging apparatus and charging the first battery on the handheld electronic device from the charging apparatus.

The method may include employing as the charging apparatus a first charging apparatus, providing current from an external power source to a second charging apparatus, and charging the second battery from the external power source. The method may include providing from a charging circuit of the charging apparatus substantially constant current to the first battery during a first portion of a charging operation, and providing substantially constant voltage to the first battery during a second portion of the charging operation. Such an improved method may also include providing current at a first voltage from the second battery to a voltage boost circuit of the charging apparatus and outputting from the voltage boost circuit current at a second voltage, the second voltage being greater than the first voltage.

Another aspect of the invention is to provide an improved electronic device, the general nature of which can be stated as including a handheld electronic device including a first battery, a holder including a second battery, and means for charging the first battery from the second battery.

Another aspect of the invention is to provide an improved holder for a handheld electronic device, the handheld electronic device including a first battery and a plurality of first contacts, in which the general nature of the holder can be stated as including a housing, a second battery, a charging apparatus, and a plurality of second contacts. The housing is adapted to hold the handheld electronic device. The second battery is disposed on the housing. The charging apparatus includes a charging circuit. The charging apparatus is disposed on the housing and is electrically connected with the second battery. The second contacts are disposed on the housing and are electrically connected with the charging apparatus. The second contacts are adapted to be electrically connectable with the first contacts of the handheld electronic device. The charging circuit is adapted to charge the first battery from the second battery.

The holder may be configured such that the charging circuit is a first charging circuit, with the charging apparatus further including a second charging circuit electrically connected with the second battery, and with the second charging circuit being adapted to charge the second battery from an external power source.

The holder may be configured such that the charging circuit is adapted to provide substantially constant current to the first battery during a first portion of a charging operation and to provide substantially constant voltage to the first battery during a second portion of the charging operation. Such a holder may be configured such that the charging apparatus further includes a voltage boost circuit that is adapted to receive current from the second battery at a first voltage and to output current to the charging circuit at a second voltage, the second voltage being greater than the first voltage.

BRIEF DESCRIPTION OF THE DRAWINGS

A full understanding of the invention can be gained from the following Description of the Preferred Embodiment when read in conjunction with the accompanying drawings in which.

Similar numerals refer to similar parts throughout the specification.

DESCRIPTION OF THE PREFERRED EMBODIMENT

Figure 1:
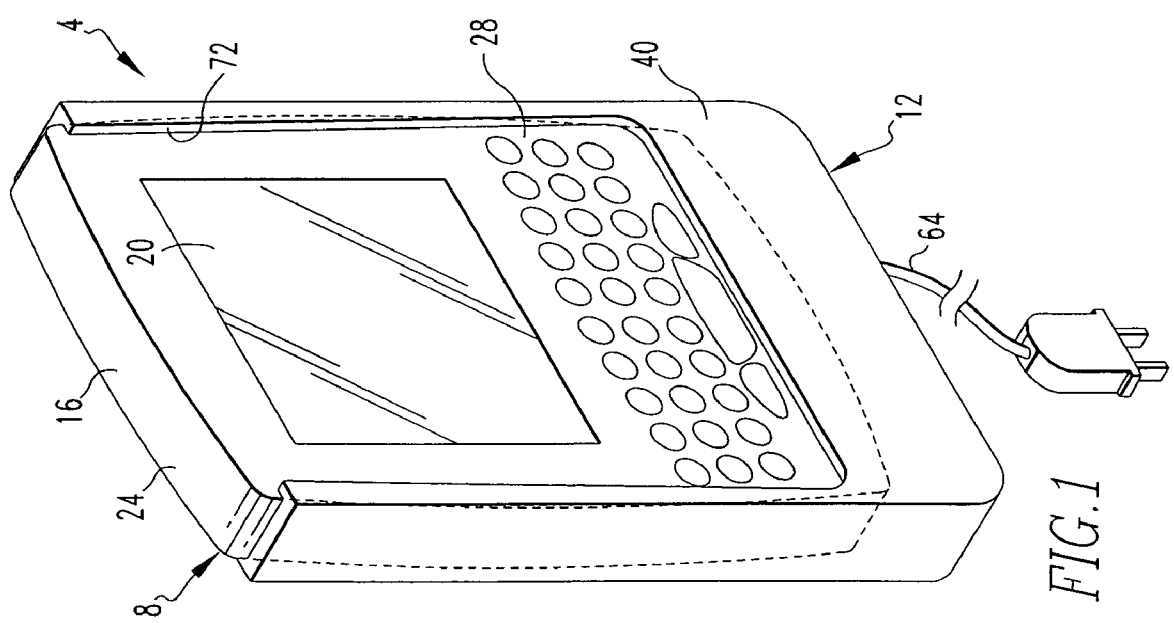
FIG. 1 is an isometric view of an improved electronic device in accordance with the invention and that includes an improved handheld electronic device and an improved holder.
Figure 2:
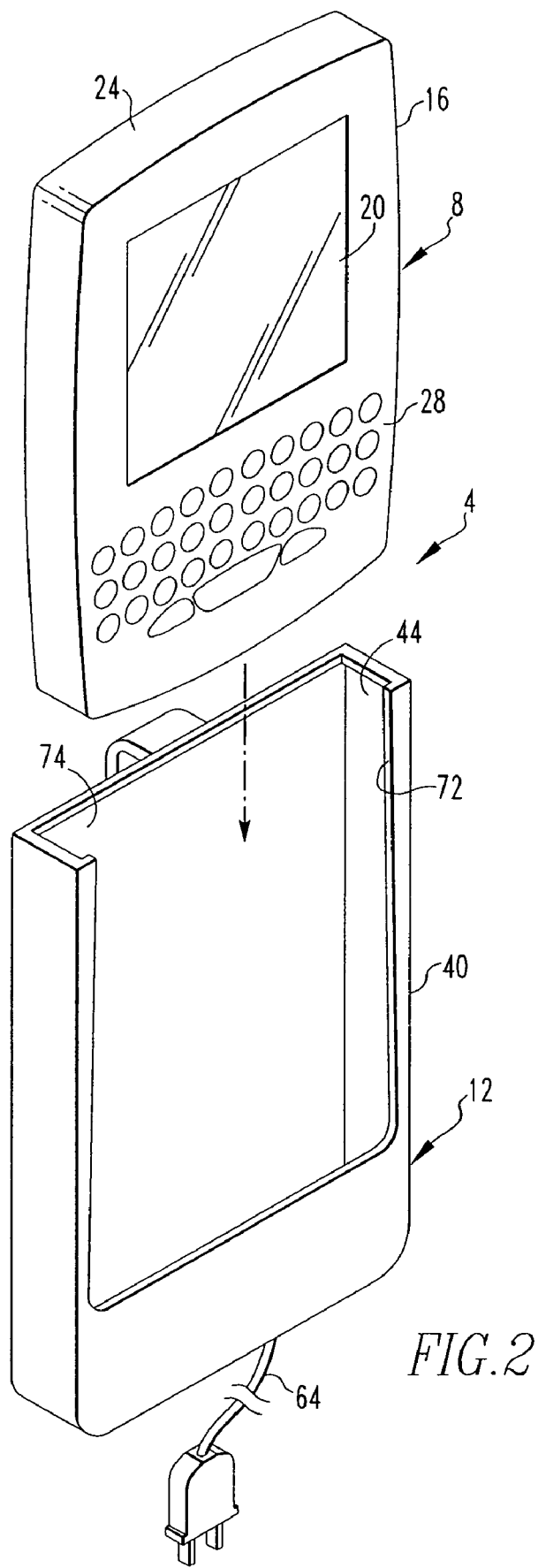
FIG. 2 is an exploded isometric view of the improved electronic device of FIG. 1.

An improved electronic device 4 in accordance with the invention is indicated generally in FIGS. 1 and 2. The electronic device 4 includes an improved handheld electronic device 8 and an improved holder 12 in accordance with the invention. The holder 12 is cooperable with the handheld electronic device 8, as will be set forth in greater detail below. Examples of handheld electronic devices are disclosed in U.S. Pat. Nos. 6,452,588 and 6,489,950, which are incorporated by reference herein.

The handheld electronic device 8 includes a housing 16, a display 20, a processor 24, a keyboard 28, and a first battery 32. The processor 24 can be any of a wide variety of processors, such as, without limitation, a microprocessor (µP). The processor 24 is operable to receive inputs from the keyboard 28 and to provide processed output to the display 20. The first battery 32 provides power to the processor 24 and the display 20. The handheld electronic device 8 additionally includes a plurality of first contacts 36 that are disposed on the housing 16 and are electrically connected with the first battery 32.

The holder 12 includes a housing 40 formed with a cavity 44, a first charging apparatus 48, a second battery 52, and a second charging apparatus 56. The first charging apparatus 48 and the second charging apparatus 56 are both electrically connected with the second battery 52. The holder 12 additionally includes a plurality of second contacts 60 (FIG. 4) disposed on the housing 40 within the cavity 44 and, in the embodiment depicted in FIGS. 1 and 2, includes a power cord 64 that is electrically connectable with a suitable external power source 68 (FIG. 4) which, in the present example, is a 110 volt AC power source. The second contacts 60 are electrically connectable with the first contacts 36 of the handheld electronic device 8. The housing 40 includes a opening 72 formed therein that enables a user to gain access to the keyboard 28 and to observe the display 20 when the handheld electronic device 8 is received in a first orientation (FIG. 1) in the housing 40.

Figure 3:
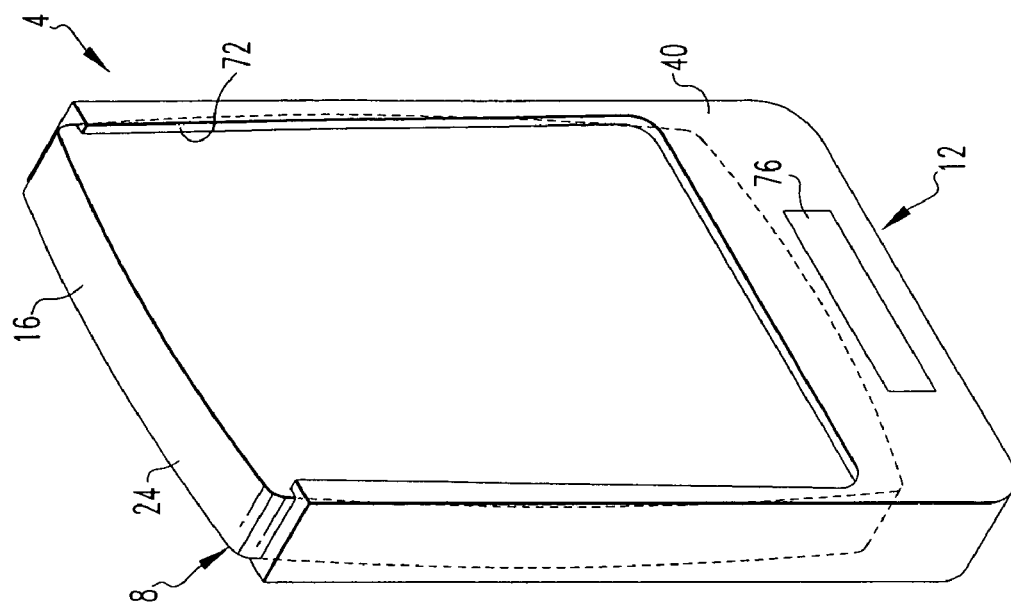
FIG. 3 is an isometric view of an improved electronic device in accordance with another embodiment of the invention.

It can be understood from FIGS. 1 and 3 that the handheld electronic device 8 can be received in the cavity 44 in the first orientation (FIG. 1) as well as in a second orientation (FIG. 3).

In the first orientation (FIG. 1), the display 20 and the keyboard 28 face generally toward the opening 72 and can be accessed by a user. In the second orientation (FIG. 3), the display 20 and the keyboard 28 face away from the opening 72 and are protected by a wall 74 (FIG. 2) of the housing 40.

The improved electronic device 4 of the invention is configured such that the first battery 32 on the handheld electronic device 8 is charged from the second battery 52 on the holder 12. More particularly, the first charging apparatus 48 is electrically connectable between the first battery 32 and the second battery 52 and provides a charging current to the first battery 32 from the second battery 52. Since the first charging apparatus 48 actively charges the first battery 32 from the second battery 52, the first battery 32 can be maintained in a fully charged condition until the second battery 52 on the holder 12 reaches a relatively discharged condition.

It thus can be seen that, by periodically receiving the handheld electronic device 8 in the cavity 44 of the holder 12, to thereby electrically connect together the first contacts 36 and the second contacts 60, the handheld electronic device 8 can receive the benefit of both the first battery 32 and the second battery 52, while carrying only the first battery 32 within the housing 16. As such, the first and second batteries 32 and 52 can both be relatively smaller than would otherwise be needed to provide the handheld electronic device 8 with sufficient battery power to allow an appropriate level of operability for an appropriate duration of time. If the first battery 32 is relatively smaller than other previously-employed batteries, then the handheld electronic device 8 will be permitted to have a relatively reduced form factor. Likewise, if the first battery 32 is relatively lighter in weight than other previously-employed batteries, then the handheld electronic device 8 will itself be of a relatively lighter weight than if it were required to carry on board one of the previously-employed batteries within the housing 16. Essentially, therefore, the battery requirements of the handheld electronic device 8 can be divided between the handheld electronic device 8 and the holder 12, which is highly advantageous for the reasons set forth above and for other reasons. As another example if, instead of configuring the first and second batteries 32 and 52 to be relatively smaller than other known batteries, either or both of the first and second batteries 32 and 52 is configured to be of a conventional size, the first and second batteries 32 and 52 together would provide a greater power capability than could be provided by an individual known battery.

Since the handheld electronic device 8 can be advantageously received in the cavity 44 in both the first orientation (FIG. 1) and the second orientation (FIG. 3), the handheld electronic device 8 in the first orientation can be operated from within the cavity 44 while the first battery 32 is being charged by the second battery 52. The first battery 32 of the handheld electronic device 8 can also be charged when the handheld electronic device 8 is in the second orientation (FIG. 3). In this regard, the first contacts 32 and the second contacts 60 are depicted in an exemplary fashion in FIG. 4. The first contacts 36 are disposed generally off center or at a corner of the housing 16. A number of the second contacts 60 are disposed at one region of the cavity 44 and are electrically connectable with the first contacts 36 when the handheld electronic device 8 is in the first orientation (FIG. 1). As used herein, the expression "a number of" and variations thereof shall refer broadly to any non-zero quantity, including a quantity of one. If the handheld electronic device 8 is received in the cavity 44 in the second orientation (FIG. 3), then the first contacts 36 are electrically connectable with other second contacts 60 disposed in another region of the cavity 44. The first battery 32 of the handheld electronic device 8, thus, can be charged by the second battery 52 whether the handheld electronic device 8 is in the first orientation (FIG. 1) or in the second orientation (FIG. 3) within the cavity 44.

Figure 6:
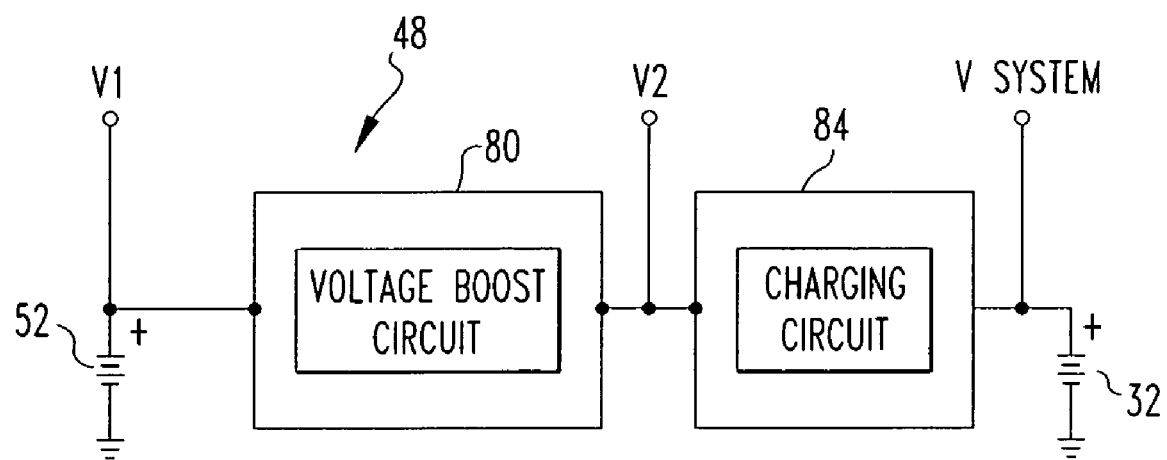
FIG. 6 is a schematic diagram in block form of a charging apparatus of the electronic device of FIG. 1.
Figure 8:
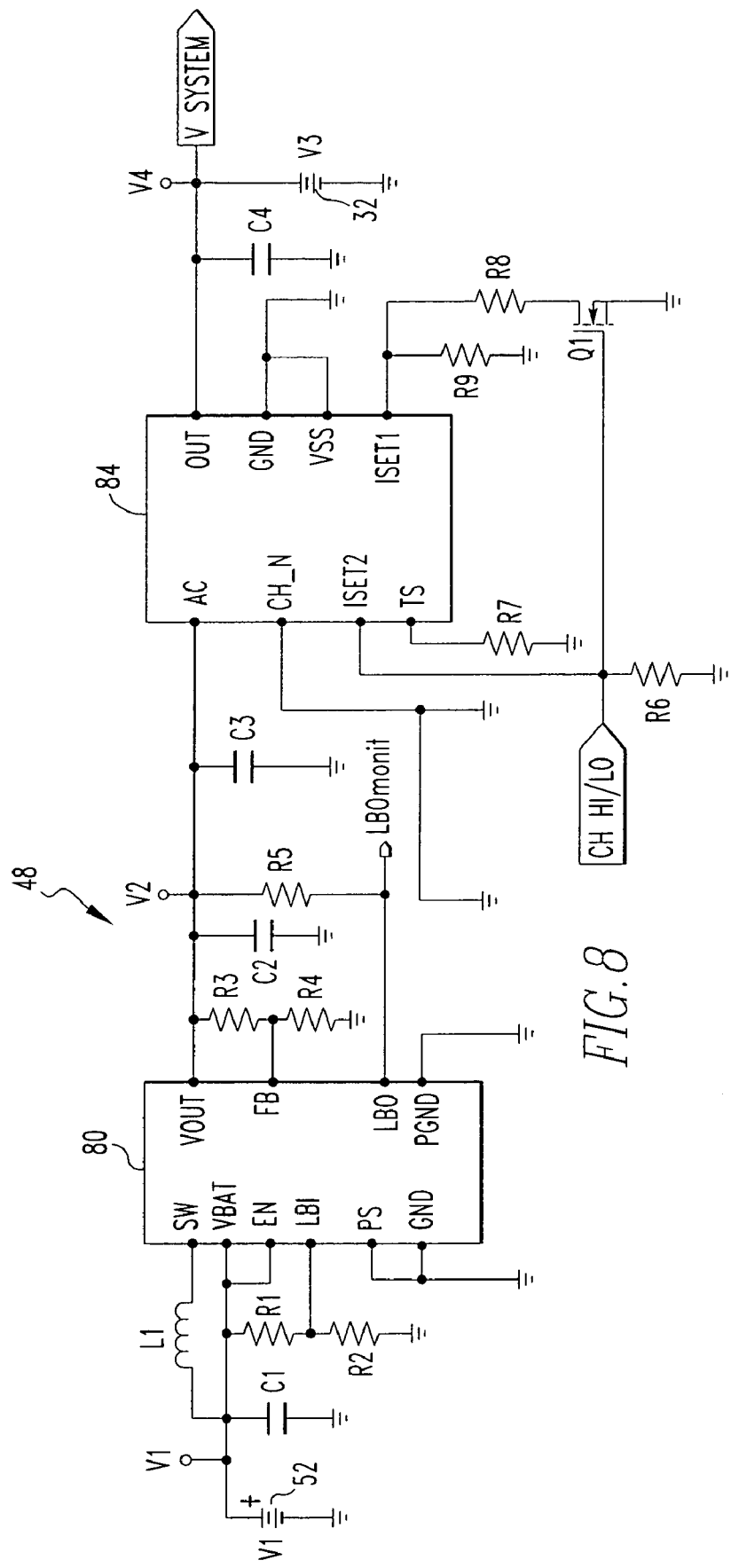
FIG. 8 is a schematic diagram of a portion of the charging apparatus of FIG. 6.

The first charging apparatus 48 is more particularly depicted in FIGS. 6 and 8. The first charging apparatus 48 includes a voltage boost circuit 80 and a charging circuit 84. The voltage boost circuit 80 can be any of a wide variety of devices and, for example, and without limitation, may be boost converter TPS61020 manufactured by Texas Instruments Incorporated of Dallas, Tex., USA, or other suitable voltage boost device. The charging circuit 84 may be any of a wide variety of devices and, for example, and without limitation, may be a battery charger BQ24020 manufactured by Texas Instruments, or other suitable battery charger device.

Figure 7:
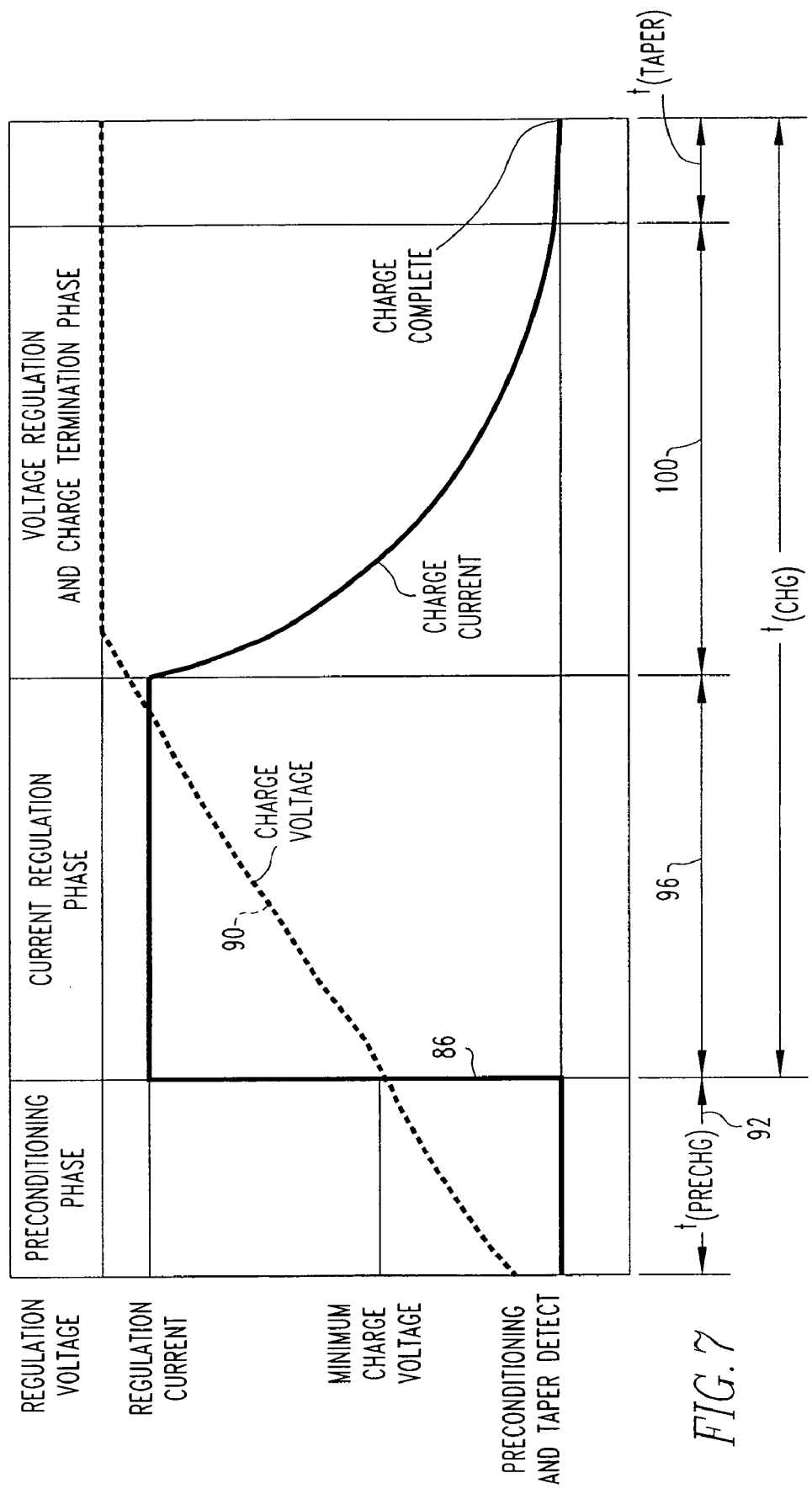
FIG. 7 is a plot depicting a voltage curve and a current curve during a charging operation of the charging apparatus of FIG. 6.

In operation, the voltage boost circuit 80 receives current at a first voltage from the second battery 52 and outputs current at a second, greater voltage to the charging circuit 84. The exemplary charging circuit 84 is configured to recharge, for example a lithium ion (Li+) battery, and would be appropriately provided when the first battery 32 is a Li+ battery. The charging circuit 84 recharges the first battery 32 according, for example, to the output curves depicted generally in FIG. 7, which depict an exemplary recharging operation of the first battery 32. FIG. 7 depicts a current curve 86 as a function of time and a voltage curve 90 as a function of time during the charging operation. After an initial preconditioning portion 92 of the charging operation, the charging circuit 84 enters a constant current portion 96 of the recharging operation in which current remains relatively constant at the current rating of the first battery 32. For instance, if the first battery 32 is, for example, a 900 mA/h battery, the maximum current during the constant current portion 96 would be 900 mA into the first battery 32.

During the constant current portion 96, the voltage continues to rise until it reaches the voltage of the first battery 32. For instance, if the first battery 32 is a 4.2 volt battery, then the voltage indicated by the voltage curve 90 would increase until it reaches 4.2 volts. Upon reaching the exemplary 4.2 volts, the charging circuit 84 would switch from the constant current portion 96 of the recharging operation to a constant voltage portion 100 of the recharging operation. During the constant voltage portion 100, the voltage of the voltage curve 90 remains substantially constant, i.e., the exemplary 4.2 volts, while the current indicated by the current curve 86 drops until the battery charging is complete at which time the charging operation terminates. It is understood that if the first battery 32 requires a different charging operation, then other types of charging circuits could be provided.

The optional second charging apparatus 56 on the holder 12 similarly includes a charging circuit 88. The charging circuit 88 is operative to charge the second battery 52 from the external power source 68 which, in the present example, is a 110 volt AC source. Depending upon the nature of the external power source 68, the second charging apparatus 56 may include an AC to DC converter or a DC to DC converter, and may or may not additionally include another voltage boost circuit similar to the voltage boost circuit 80.

As a further example, and as indicated in FIG. 3, the second battery 52 may be a replaceable battery (not expressly shown) that can be removably disposed within an interior region of the holder 12, such as behind the door 76 of FIG. 3. In such a circumstance, the power cord 64 and the second charging apparatus 56 may not be needed.

Figure 4:
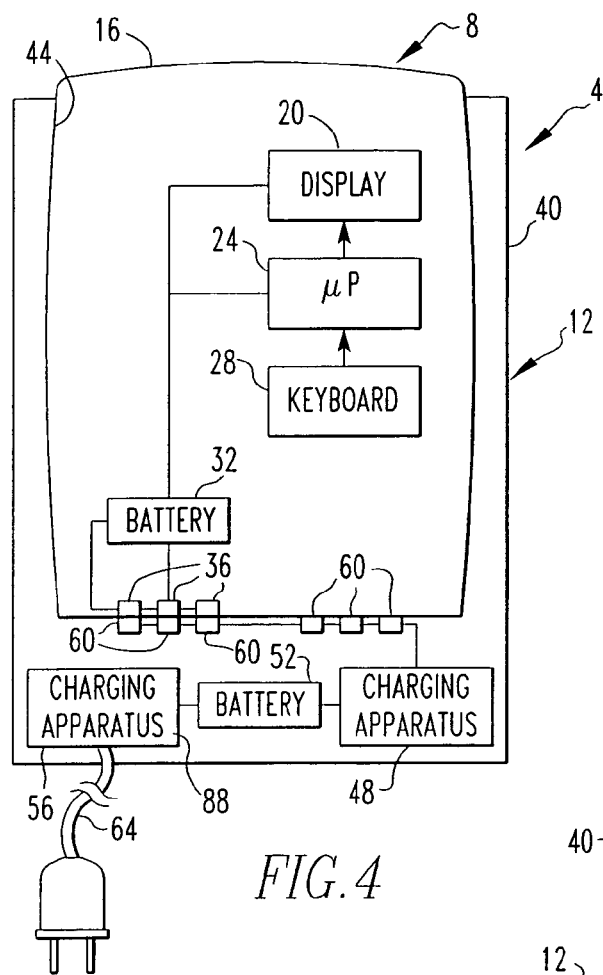
FIG. 4 is block diagram of the electronic device of FIG. 1.
Figure 5:
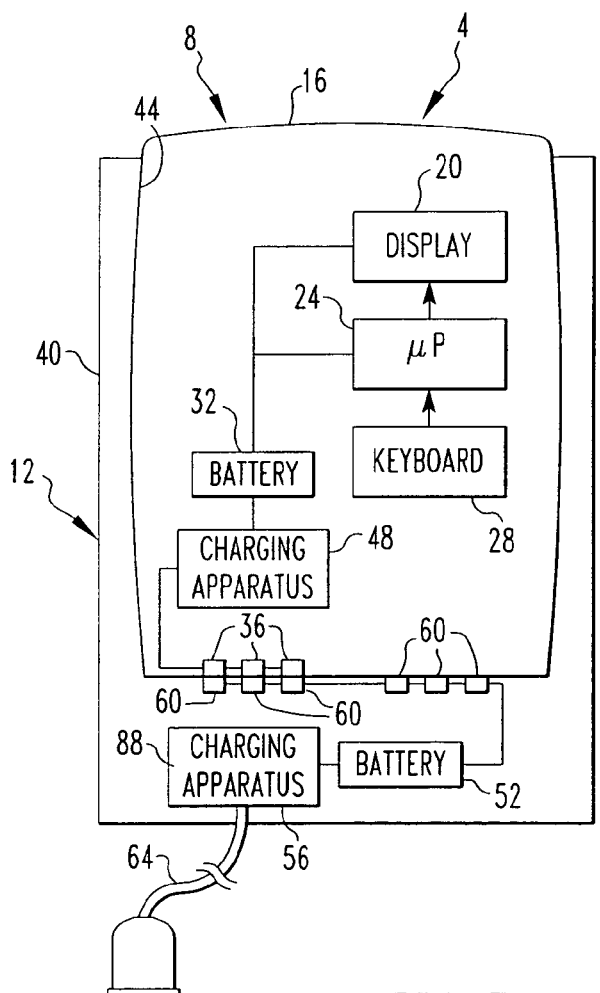
FIG. 5 is a block diagram of an electronic device in accordance with another embodiment of the invention.

While the first charging apparatus 48 is depicted in FIG. 4 as being disposed on the holder 12, it is understood that in other embodiments, the first charging apparatus 48, or a portion thereof, may be disposed on the handheld electronic device 8, such as is indicated generally in FIG. 5.

As will be apparent to those skilled in the relevant art, the first and second batteries 32 and 52, as well as the first and second charging apparatuses 48 and 56, can be in different configurations than set forth above. For instance, some of the battery arrangements in the handheld electronic device 8 (primary battery) and the holder 12 (supplemental battery) could be as follows: (1) a relatively large primary rechargeable cell with a relatively small charging source (for example, 900 mA/h Li+ battery used as a primary cell and a AA alkaline battery used for the charging source); (2) a relatively large primary rechargeable cell with a relatively large charging source (for example, 900 mA/H Li+ battery used as a primary cell and a 900 mA/h Li+ battery used for the charging source); (3) a relatively large primary rechargeable cell with a relatively small supplementary rechargeable battery; (4) a relatively small primary rechargeable cell with a relatively small charging source; (5) a relatively small primary rechargeable cell with relatively a small rechargeable supplementary battery; and (6) a relatively small primary rechargeable cell with a relatively large rechargeable supplementary battery.

Figure 9:
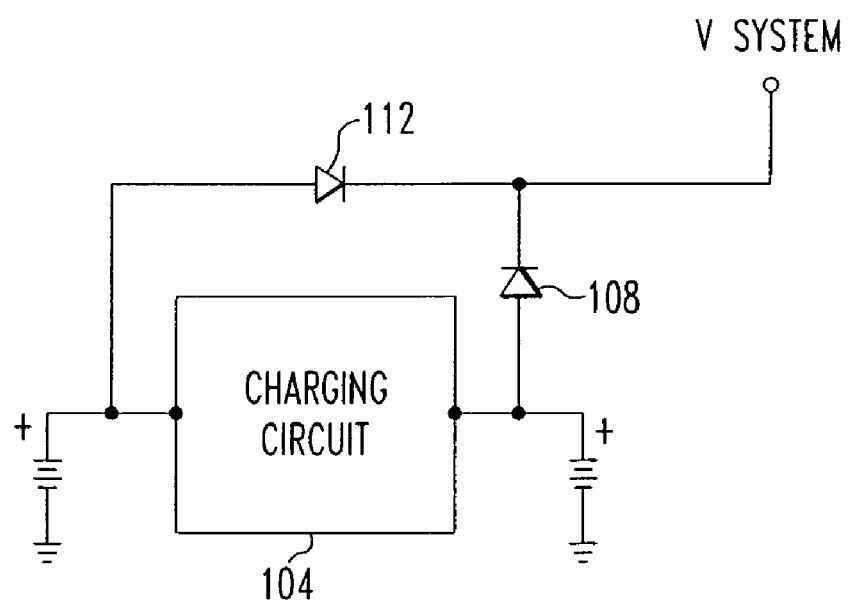
FIG. 9 is a schematic diagram in block form of another embodiment of a charging circuit that can be employed in the electronic device of FIG. 1.

An exemplary alternative charging circuit is depicted generally in FIG. 9. More specifically, FIG. 9 depicts an alternative charging circuit 104, a first diode 108, and a second diode 112. The charging circuit 104 may be similar to the charging circuit 84 of FIG. 6, or may be of other suitable configurations. The arrangement of the first and second diodes 108 and 112 would auctioneer the current requirements of the handheld electronic device 8 between the first and second batteries 32 and 52. Also, depending on the state of charge of the first and second batteries 32 and 52, the first battery 32 could be charged from the second battery 52 with the charging circuit 104 while the handheld electronic device 8 is operating.

It thus can be seen that the improved electronic device 4 of the invention provides the improved handheld electronic device 8 and the improved holder 12 with a unique battery configuration. The first and second batteries 32 and 52 could be of a wide range of different suitable configurations. It is further understood that the first and second charging apparatuses 48 and 56 can be of numerous different configurations according to the configurations of the first and second batteries 32 and 52 as well as the external power source 68. While the holder 12 is depicted herein as being a handheld device, such as a holster that can receive the handheld electronic device 8, the holder 12 could be of other configurations without departing from the concept of the invention. For instance, the holder 12 could be a handheld device such as a cradle, bracket, platform, and the like, and also could be a desktop device such as a desktop cradle, bracket, platform, and the like.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An electronic device comprising:
a handheld electronic device having a first battery;
a holder having a second battery;
said handheld electronic device and said holder being electrically connectable together; and
a charging apparatus disposed on at least one of said handheld electronic device and said holder, said charging apparatus being adapted to charge said first battery from said second battery, said charging apparatus comprising a voltage boost circuit and a charging circuit, the voltage boost circuit being adapted to receive current from said second battery at a first voltage and to output current to said charging circuit at a second voltage greater than said first voltage, wherein
said handheld electronic device includes a plurality of first contacts and said holder includes a plurality of second contacts, said first contacts and said second contacts being electrically connectable together,
said handheld electronic device is receivable in said holder in a first orientation and in a second orientation, at least a portion of said first contacts and at least a portion of said second contacts being electrically connectable together when said handheld electronic device is received in said holder in said first orientation, at least a portion of said first contacts and at least a portion of said second contacts being electrically connectable together when said handheld electronic device is received in said holder in said second orientation, and in said first orientation, a display and a keyboard are structured to face generally toward an opening of said holder, and in said second orientation, the display and the keyboard are structured to face generally from the opening toward a wall of said holder.

2. The electronic device of claim 1 wherein said holder includes a receptacle, with said handheld electronic device being receivable in said receptacle.

3. The electronic device of claim 1 wherein said handheld electronic device is adapted to be operated and charged when in either of said first orientation and said second orientation.

4. The electronic device of claim 1 wherein said charging circuit is adapted to provide substantially constant current to said first battery during a first portion of a charging operation and to provide substantially constant voltage to said first battery during a second portion of said charging operation.

5. The electronic device of claim 1 wherein said charging apparatus is adapted to provide current from said second battery to said first battery to charge said first battery.

6. The electronic device of claim 1 wherein said charging apparatus is a first charging apparatus; and wherein said holder includes a second charging apparatus adapted to charge said second battery from an external power source.

7. The electronic device of claim 6 wherein said second charging apparatus includes a charging circuit that is adapted to provide substantially constant current to said second battery during a first portion of a charging operation and to provide substantially constant voltage to said second battery during a second portion of said charging operation.

8. The electronic device of claim 1 wherein said holder is a handheld holder.

9. A holder for a handheld electronic device, said handheld electronic device including a first battery and a plurality of first contacts, said holder comprising:
a housing adapted to hold said handheld electronic device;
a second battery disposed on said housing;
a charging apparatus including a voltage boost circuit and a charging circuit, said charging apparatus being disposed on said housing and electrically connected with said second battery; and
a plurality of second contacts disposed on said housing and electrically connected with said charging apparatus,
said charging circuit being adapted to charge said first battery from said second battery,
said voltage boost circuit being adapted to receive current from said second battery at a first voltage and to output current to said charging circuit at a second voltage greater than said first voltage, said handheld electronic device being receivable in said housing in a first orientation and in a second orientation, at least a portion of said first contacts and at least a portion of said second contacts being electrically connectable together when said handheld electronic device is received in said housing in said first orientation, at least a portion of said first contacts and at least a portion of said second contacts being electrically connectable together when said handheld electronic device is received in said housing in said second orientation, and in said first orientation, a display and a keyboard are structured to face generally toward an opening of said holder, and in said second orientation, the display and the keyboard are structured to face generally from the opening toward a wall of said holder.

10. The holder of claim 9 wherein said charging circuit is a first charging circuit; and wherein said charging apparatus further includes a second charging circuit electrically connected with said second battery, said second charging circuit being adapted to charge said second battery from an external power source.

11. The holder of claim 9 wherein said charging circuit is adapted to provide current from said second battery to said second contacts to charge said first battery on said handheld electronic device.

12. The holder of claim 9 wherein said housing is a handheld housing.

13. The holder of claim 9 wherein said charging circuit is adapted to provide substantially constant current to said first battery during a first portion of a charging operation and to provide substantially constant voltage to said first battery during a second portion of said charging operation.

* * * * *

UNITED STATES PATENT AND TRADEMARK OFFICE
CERTIFICATE OF CORRECTION

PATENT NO. : 7,479,759 B2 Page 1 of 1
APPLICATION NO. : 10/788078
DATED : January 20, 2009
INVENTOR(S) : B. Vitanov et al.

It is certified that error appears in the above-identified patent and that said Letters Patent is hereby corrected as shown below:

Title page, Item (12) and Item (75) Inventors, delete "Vilanov" and insert therefor -- Vitanov --

Signed and Sealed this

Fifteenth Day of June, 2010

David J. Kappos
*Director of the United States Patent and Trademark Office*